(12) United States Patent
Zeng et al.

(10) Patent No.: US 12,633,316 B2
(45) Date of Patent: *May 19, 2026

(54) METHOD, APPARATUS, DEVICE AND MEDIUM FOR GENERATING A VIDEO

(71) Applicant: Beijing Youzhuju Network Technology Co., Ltd., Beijing (CN)

(72) Inventors: Yan Zeng, Beijing (CN); Guoqiang Wei, Beijing (CN); Jiaxin Zou, Beijing (CN); Yuchen Zhang, Beijing (CN); Hang Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/187,486

(22) Filed: Apr. 23, 2025

(65) Prior Publication Data

US 2025/0252977 A1 Aug. 7, 2025

Related U.S. Application Data

(63) Continuation of application No. 18/775,188, filed on Jul. 17, 2024, now Pat. No. 12,308,050.

(30) Foreign Application Priority Data

Nov. 17, 2023 (CN) .......................... 202311542534.2

(51) Int. Cl.
| | |
|---|---|
| *G11B 27/036* | (2006.01) |
| *G06V 20/40* | (2022.01) |
| *G11B 27/34* | (2006.01) |

(52) U.S. Cl.
CPC ............ *G11B 27/036* (2013.01); *G06V 20/46* (2022.01); *G11B 27/34* (2013.01)

(58) Field of Classification Search
CPC ....... G11B 27/036; G11B 27/34; G06V 20/46
See application file for complete search history.

(56) References Cited

U.S. PATENT DOCUMENTS

| | | | | |
|---|---|---|---|---|
| 12,308,050 | B1 * | 5/2025 | Zeng ...................... | G11B 27/34 |
| 2024/0169479 | A1 * | 5/2024 | Wang .................... | G06T 3/4053 |

FOREIGN PATENT DOCUMENTS

JP 2021033961 A 3/2021

OTHER PUBLICATIONS

Notice of Reasons for Refusal for Japanese Application No. 2024-114172, mailed May 20, 2025, 4 pages.

* cited by examiner

*Primary Examiner* — Girumsew Wendmagegn
(74) *Attorney, Agent, or Firm* — Alleman Hall LLP

(57) ABSTRACT

Provided area method and an apparatus for generating a video, a device, and a medium. In one method, a first reference image and a second reference image are determined from a plurality of reference images in a reference video. A reference text for describing the reference video is received. A generation model is acquired based on the first reference image, the second reference image and the reference text. The generation model is configured to generate a target video based on a first image, a second image and a text. With example implementations of the present disclosure, the second reference image can serve as guiding data to determine a development direction of a story in the video. In this way, the generation model can clearly grasp changes of various image contents in the video, which is beneficial to generating richer and more realistic videos.

20 Claims, 9 Drawing Sheets

700

430 DIFFUSION MODEL

800

810 INPUT DATA

812 FIRST IMAGE          814 SECOND IMAGE

816 TEXT

A POLAR BEAR IS WALKING ON THE ICE SURFACE.

820 TARGET VIDEO

METHOD, APPARATUS, DEVICE AND MEDIUM FOR GENERATING A VIDEO

CROSS-REFERENCE

This application is a continuation of U.S. patent application Ser. No. 18/775,188 filed on Jul. 17, 2024, entitled "METHOD, APPARATUS, DEVICE AND MEDIUM FOR GENERATING A VIDEO", which claims priority to Chinese Patent Application No. 202311542534.2, filed Nov. 17, 2023, both of which are incorporated herein by reference in their entireties.

FIELD

Example implementations of the present disclosure generally relate to computer vision, and in particular to a method and an apparatus for generating a video by using a machine learning model, a device and a computer-readable storage medium.

BACKGROUND

The machine learning technology has been widely used in many technical fields. In the field of computer vision, many technical solutions have been proposed to automatically generate videos by using a machine learning model. For example, the corresponding video may be generated based on a pre-specified image and a text for describing a video content. However, at present, pictures in the generated video usually have poor dynamicity, for example, objects in the video lack obvious actions and dynamic effects, so it is difficult to achieve real motion visual effects. At this time, it is expected that the video including desired contents can be generated in a more convenient and effective way.

SUMMARY

In a first aspect of the present disclosure, a method for generating a video is provided. In the method, a first reference image and a second reference image are determined from a plurality of reference images in a reference video. A reference text for describing the reference video is received. A generation model is acquired based on the first reference image, the second reference image and the reference text. The generation model is configured to generate a target video based on a first image, a second image and a text.

In a second aspect of the present disclosure, an apparatus for generating a video is provided. The apparatus includes: an image determination module configured to determine a first reference image and a second reference image from a plurality of reference images in a reference video; a text determination module configured to receive a reference text for describing the reference video; and an acquisition module configured to acquire a generation model based on the first reference image, the second reference image and the reference text, wherein the generation model is configured to generate a target video based on a first image, a second image and a text.

In a third aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the electronic device to execute the method according to the first aspect.

In a fourth aspect of the present disclosure, a computer-readable storage medium is provided and has a computer program stored thereon, wherein the computer program, when executed by a processor, causes the processor to implement the method according to the first aspect.

It should be understood that the content described in this section is not intended to define key features or important features of implementations of the present disclosure, nor is it intended to limit the scope of the present disclosure. Other features of the present disclosure will be readily understood from the following descriptions.

BRIEF DESCRIPTION OF THE DRAWINGS

The above and other features, advantages and aspects of various implementations of the present disclosure will become more apparent hereinafter with reference to the following detailed descriptions and in conjunction with the accompanying drawings. In the accompanying drawings, the same or similar reference numerals indicate the same or similar elements, in which.

DETAILED DESCRIPTION

Figure 1:
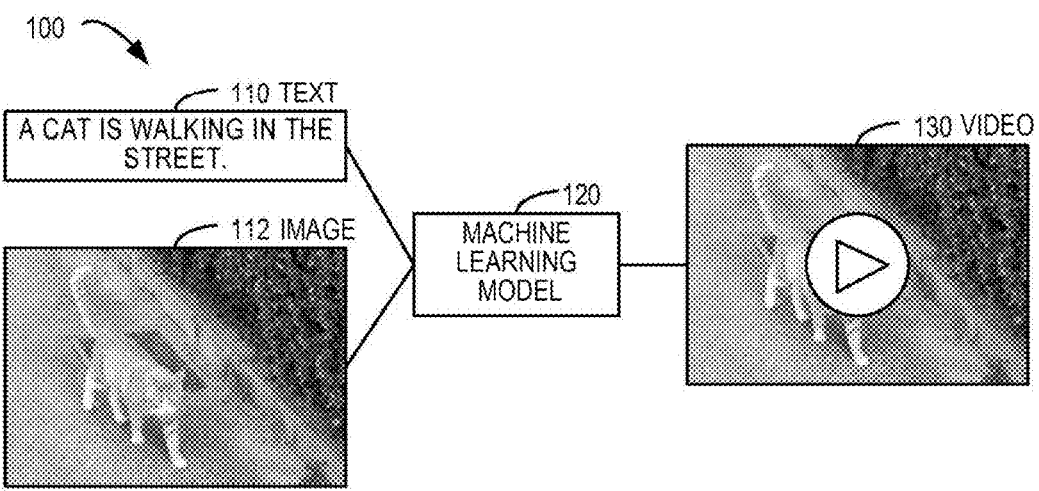
FIG. 1 shows a block diagram according to a technical solution for generating a video.

Hereinafter, the implementations of the present disclosure will be described in more detail with reference to the accompanying drawings. Although some implementations of the present disclosure are shown in the accompanying drawings, it should be understood that the present disclosure can be realized in various forms and should not be construed as limited to the implementations set forth here. On the contrary, these implementations are provided for a more thorough and complete understanding of the present disclosure. It should be understood that the accompanying drawings and implementations of the present disclosure are only used for illustrative purposes, and are not used to limit the protection scope of the present disclosure.

In the descriptions of the implementations of the present disclosure, the term "includes" and similar terms should be understood as open inclusion, that is, "includes but not limited to". The term "based on" should be understood as "at least partially based on". The term "one implementation" or "the implementation" should be understood as "at least one implementation". The term "some implementations" should be understood as "at least some implementations". Other explicit and implicit definitions may be included below. As used herein, the term "model" may represent an association relationship between various data. For example, the above association relationship may be acquired based on various technical solutions currently known and/or to be developed in the future.

It is understandable that the data involved in this technical solution (including but not limited to the data itself and acquisition or use of the data) shall comply with the requirements of corresponding laws, regulations and relevant stipulations.

It is understandable that before using the technical solutions disclosed in various embodiments of the present disclosure, users should be informed of the types, use scopes, use scenes and the like of personal information involved in the present disclosure in an appropriate way according to relevant laws and regulations, and user authorization should be acquired.

For example, in response to receiving an active request of the user, prompt information is sent to the user to explicitly remind the user that the operation requested to be executed will require the acquisition and use of the personal information of the user. Therefore, the user can independently choose whether to provide the personal information to software or hardware such as an electronic device, an application program, a server or a storage medium that executes operations of the technical solutions of the present disclosure according to the prompt information.

As an optional but non-limiting implementation, in response to receiving the active request of the user, the prompt information may be sent to the user, for example, in a pop-up window, in which the prompt information may be presented in words. In addition, the pop-up window may also carry a selection control for the user to choose "agree" or "disagree" to provide the personal information to the electronic device.

It is understandable that the above process of notifying and acquiring the user authorization is only schematic and does not limit the implementations of the present disclosure, and other ways meeting relevant laws and regulations may also be applied to the implementations of the present disclosure.

The term "in response to" used here indicates a state in which a corresponding event occurs or a condition is met. It will be understood that the execution timing of a subsequent action executed in response to the event or condition is not necessarily strongly related to the time when the event occurs or the condition is established. For example, in some cases, the subsequent action may be executed immediately when the event occurs or the condition is established; and in other cases, the subsequent action may be executed after a period of time has passed since the event occurred or the condition was established.

Example Environment

The machine learning technology has been widely used in many technical fields. In the field of computer vision, it has been proposed to automatically generate videos by using a machine learning model. The existing methods for generating a video mainly focus on text-to-video generation or single image-based video generation. Although the generated video can involve object movement, the action duration is short and only has transient dynamicity, the dynamicity is poor and the expected information is not presented.

A generation way is described with reference to FIG. 1, which shows a block diagram 100 according to a technical solution for generating a video. As shown in FIG. 1, a machine learning model 120 may be acquired, where the machine learning model 120 may be generated based on reference data in a pre-built training data set. A text 110 may be used to specify a content of the video to be generated, and an image 112 may be used to specify an environment of the video (for example, as a first frame image, or an image at other positions). In this example, the text 110 may indicate, for example, "a cat is walking in the street". At this time, the machine learning model 120 may generate a video 130 based on the text 110 and 112, and the video content is that the cat is walking along the street.

However, it is usually difficult for the pictures in the video generated at present to achieve real visual effects. Creation of high-dynamic action videos, complex camera-era actions, visual effects, close-ups of expressions or shot transition faces an arduous challenge. The current methods for generating a video mainly focus on text-to-video generation, tend to generate videos with a minimum motion amplitude, and can only generate shorter video segments, the shape of an object (for example, the cat) in the video may be similar to that in the image 112, and movements of the cat are possibly stiff and the motion amplitude is very small. At this time, it is expected that the video including desired contents can be generated in a more convenient and effective way.

Summary of Video Generation

Since the video requires an extra time dimension and consists of many key frames, it is difficult to accurately describe each key frame with a simple language. In addition, the types of motion in the video are very diverse. The existing technical solutions are not only resource-intensive, but also pose considerable challenges to a generation model. In order to understand complex text descriptions and generate matching videos, a scale of the model will increase dramatically, and the amount of required annotation data will also increase significantly.

In order to at least partially solve the shortcomings in the prior art, according to an example implementation of the present disclosure, the technical solution of video generation based on a diffusion model (for example, called Pixel Dance) is proposed. In summary, a machine learning architecture based on the diffusion model is proposed, which can combine image instructions of a first frame and a last frame in the video with text instructions for video generation. Comprehensive experimental results show that the video generated by using the technical solution of the present disclosure shows excellent visual effects in synthesizing the videos with complex scenes and complex movements.

According to an example implementation of the present disclosure, the first frame image instruction may set a scene of video generation (and establish a character). The first frame also enables the model to generate continuous videos. In this case, the model uses the last frame of the previous video as the first frame instruction of the subsequent video to generate the subsequent video. Further, the last frame instruction describing an end state of the video may serve as an additional control mechanism. In this way, the alignment between the expectation of a user and the text can be enhanced (that is, the generated video is more in line with the expectation of the user), and the model can build complex shots, and finally generate a rich video content, thereby ensuring diversity and coherence.

In summary, the <text, first frame, last frame> instructions may be used as conditions. Given the above three instructions, the model may focus on learning the dynamics of people, animals, objects and other entities in the world in a training stage; and in reasoning, the model may "generalize" the learned movement laws of a physical world to the fields that are not involved in training, such as realizing the movement of cartoon characters, special effects shots, and the like.

Specifically, the above information may be integrated into the diffusion model. For example, text information is encoded by a pre-trained text encoder, and then embedded into the diffusion model by using a cross-attention mechanism. The image instructions are encoded by a pre-trained variational automatic encoder (VA E), and connected with a disturbed video content or Gaussian noise as an input of the diffusion model. In the training process, the first frame image of the video may be directly taken as the first frame instruction, and the model is forced to strictly follow the instruction, thereby maintaining continuity between consecutive videos. In the process of reasoning, the instruction may be conveniently acquired from the text-to-image model or directly provided by the user.

Accordingly, the model should be prevented from copying the last frame instruction during video generation since it is challenging to acquire the perfect last frame in the inference process. Therefore, the design of this model can adapt to a rough sketch provided by the user as a guidance, thereby generating the corresponding video. This sketch may be created by using basic image editing tools. The user may also provide a hand-drawn outline as the last frame guidance. It should be understood that the sketch here may be a sketch drawn by using the image editing tool.

Figure 2:
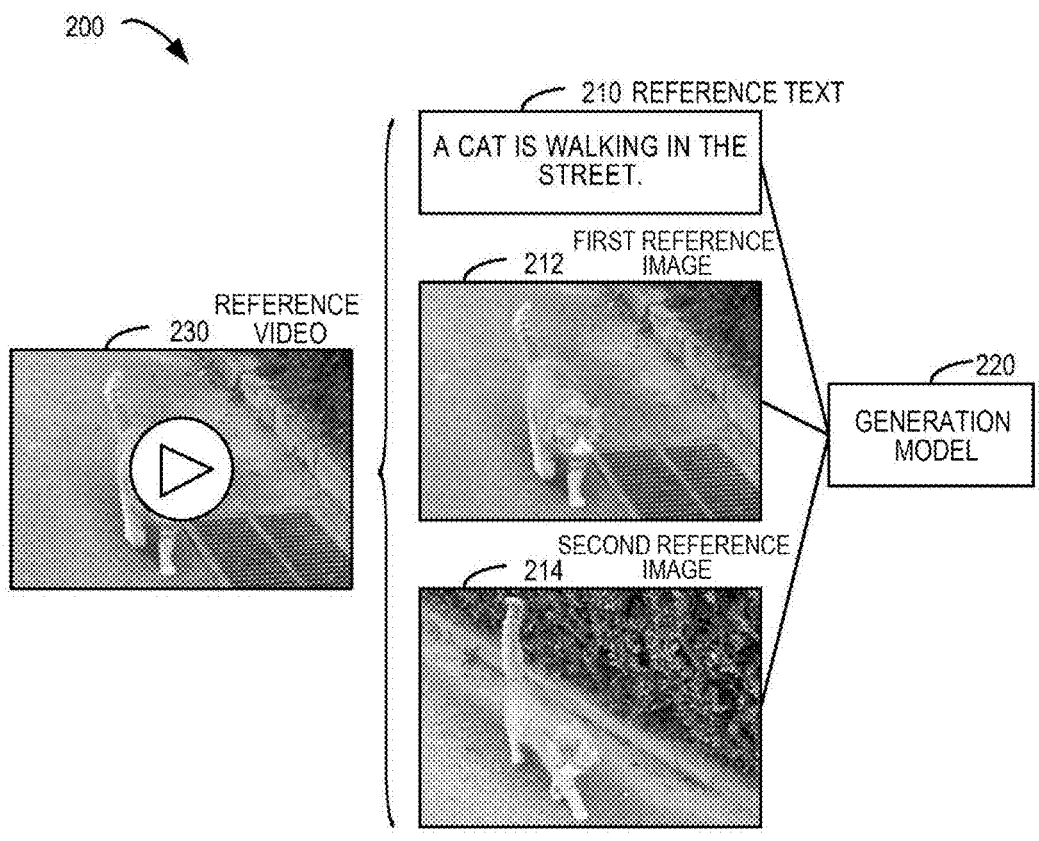
FIG. 2 shows a block diagram of a process for generating a video according to some implementations of the present disclosure.

The summary of an example implementation according to the present disclosure is described with reference to FIG. 2, which shows a block diagram 200 of a process for generating a video according to some implementations of the present disclosure. As shown in FIG. 2, a generation model 220 as shown in FIG. 2 may be constructed, and the generation model may describe a relationship between input data and output data. At this time, the input data may include, for example, a text for describing a video content, a start image (for example, it may be called a first image) for representing a first frame image in the video, and a guide image (for example, it may be called a second image) for representing a last frame image in the video. The output data may, for example, include the video.

According to an example implementation of the present disclosure, the generation model 220 may be established based on various architectures currently known and/or to be developed in the future. In the training stage, sample data may be extracted from a reference video 230, and then the generation model 220 is trained. As shown in FIG. 2, the reference video 230 including a plurality of reference images may be acquired, and a first reference image 212 and a second reference image 214 may be acquired from the plurality of reference images. Here, the first reference image 212 (for example, the first frame image) may be acquired from a head position of the reference video 230, and the second reference image 214 (for example, the last frame image or an image within a predetermined range before the last frame image) may be acquired from a tail position of the reference video 230. Further, a reference text 210 for describing the reference video may be received.

As shown in FIG. 2, the reference video 230 may include a cat, and cats in the first reference image 212 and the second reference image 214 may be located in different positions in the picture. At this time, the text 110 may indicate "a cat is walking in the street". Further, the generation model 220 may be trained based on the first reference image 212, the second reference image 214 and the reference text 210. At this time, the trained generation model 220 may generate a target video based on the first image, the second image and the text.

In the process of processing the last frame instruction, various strategies may be adopted to adjust an influence of the last frame. During training, the last frame instruction may be randomly selected from last three truth value frames of the reference video. Noise may be introduced into the instruction to improve robustness the model's dependence on the instructions. In the training stage, the last frame instruction may be randomly discarded with a certain probability. Accordingly, a simple and effective reasoning strategy is proposed. For example, in the first $\tau$ denoising steps of a backward process of the diffusion model, the last frame instruction may be used to guide the video generation towards a desired end state. Then, in the remaining steps, the last frame instruction may be discarded, thereby allowing the model to generate more coherent video contents in time. The intensity of the last frame guidance may be adjusted by $\tau$.

It should be understood that FIG. 2 only schematically shows the process of acquiring the generation model 220, and alternatively and/or additionally, a plurality of reference videos may be acquired and corresponding data may be extracted from the plurality of reference videos, so as to continuously update the generation model 220 in an iterative way. For example, the reference videos of different objects executing different actions may be acquired, so that the generation model 220 can master richer video generation knowledge. According to an example implementation of the present disclosure, the video generation process may be realized in a multilingual environment. Although the reference text in FIG. 2 is expressed in English, alternatively and/or additionally, the reference text may be expressed based on other languages, such as Chinese, French and Japanese.

With the example implementation of the present disclosure, in the process of determining the generation model 220, the first reference image 212 may be used as the start image of the video, and the second reference image 214 may be used as guiding data to determine a development direction of a story in the video. For example, the generated video may take the second reference image 214 as the last frame. In this way, the generation model 220 can clearly master changes of various image contents in the video, which is beneficial to generating a richer and more realistic video.

Detailed Process of Video Generation

The summary of video generation has been described, and more details about the video generation will be described below. According to an example implementation of the present disclosure, in order to determine the first reference image, the reference image located at the head of the reference video may be determined as the first reference image. In other words, the first frame image in the reference video may be used as the first reference image. In this way, the process of constructing training data can be simplified, and the training data is acquired in a fast and efficient way.

According to an example implementation of the present disclosure, the second reference image may be determined based on various ways. For example, the last frame image in the reference video may be used as the second reference image. Alternatively and/or additionally, in order to introduce a disturbance factor into the training data, the second reference image may be determined from a group of reference images located within a predetermined range at the tail of the reference video.

Figure 3:
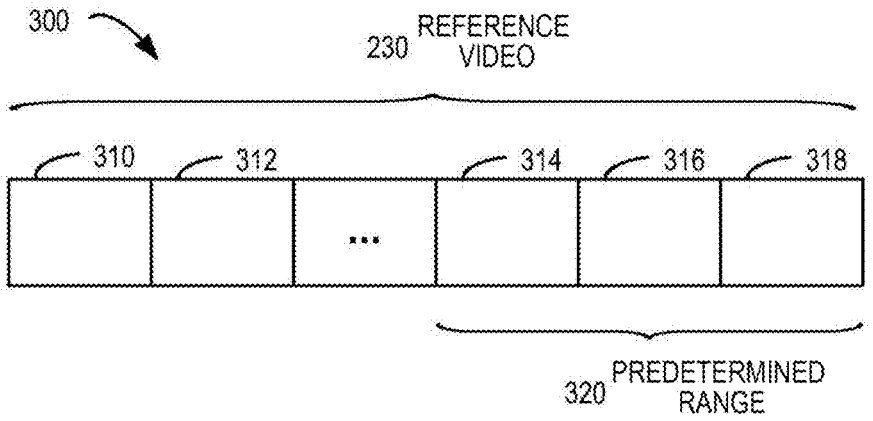
FIG. 3 shows a block diagram of a process for determining a second reference picture according to some implementations of the present disclosure.

More details are described with reference to FIG. 3, which shows a block diagram 300 of a process for determining the second reference video according to some implementations of the present disclosure. As shown in FIG. 3, it is assumed that the reference video 230 includes a plurality of reference images: a reference image 310 at the first frame position, reference images 312, . . . , 314, 316, and a reference image 318 at the last frame position. For example, a predetermined range 320 may represent the last 3 frames (or other numbers) at the tail of the reference video. It is assumed that the reference video includes N image frames, any one of the $N^{th}$ frame, the $(N-1)^{th}$ frame, and the $(N-2)^{th}$ frame in the reference video may be used as the second reference image. A t this time, the second reference image may include any of the reference images 314, 316 and 318. In this way, the influence of the last frame on the training process can be weakened to some extent, so that a more coherent video can be acquired.

Figure 4:
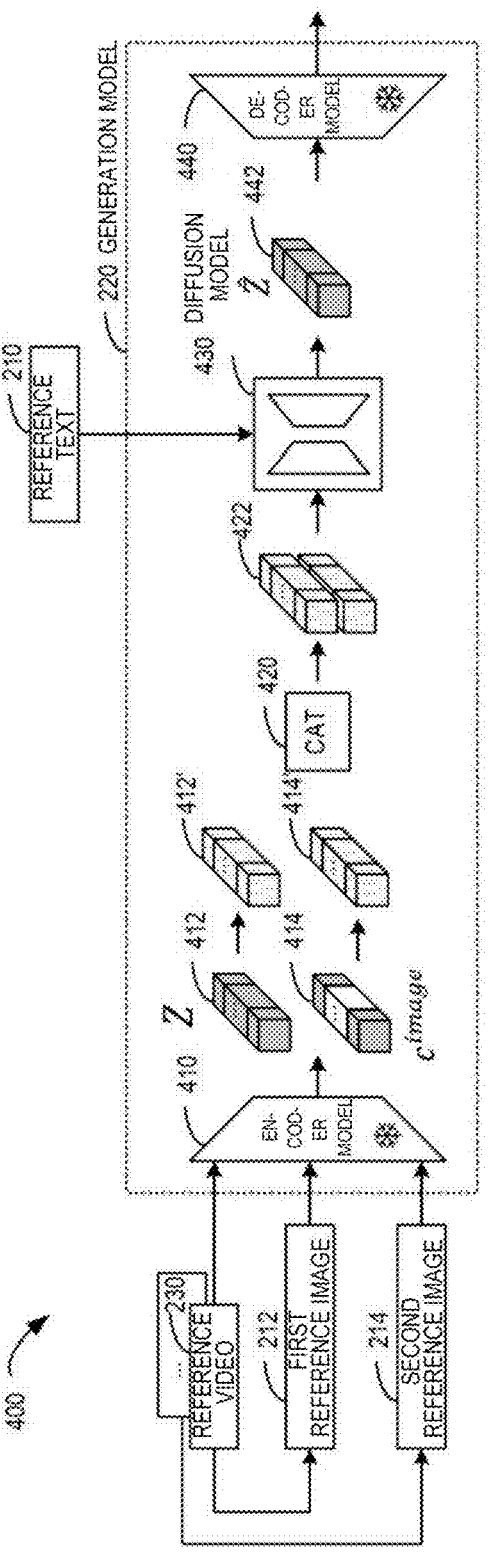
FIG. 4 shows a block diagram of a process for determining a generation model according to some implementations of the present disclosure.

More information about the generation model is described with reference to FIG. 4, which shows a block diagram 400 of a process for determining the generation model according to some implementations of the present disclosure. As shown in FIG. 4, the generation model 220 may include an encoder model 410, a connection model 420, a diffusion model 430, and a decoder model 440. Here, the encoder model 410 and the decoder model 440 may have predetermined structures and parameters. During the subsequent updating of parameters of the generation model 220, the parameters of the encoder model 410 and the decoder model 440 will not be updated. According to an example implementation of the present disclosure, a VAE and a corresponding decoder may be used.

In FIG. 4, the generation model 220 may be acquired based on the first reference image 212, the second reference image 214 and the reference text 210. Specifically, the encoder model 410 may be used to determine a first reference feature 412 (for example, denoted as Z) of the reference video 230, and the first reference feature 412 may include a plurality of reference image features of a plurality of reference images. Further, the encoder model 410 may be used to determine a second reference feature 414 (for example, denoted as $c^{image}$) of the reference video, and the second reference feature includes a first reference image feature of the first reference image and a second reference image feature of the second reference image.

According to an example implementation of the present disclosure, the first reference feature 412 may include a plurality of dimensions, and each dimension may correspond to one reference image, that is, the feature from one reference image (having a predetermined dimension, for example, $\mathbb{R}^{C*H*W}$ wherein C represents the number of channels, H represents an image height, and W represents an image width) may be stored at each dimension. According to an example implementation of the present disclosure, the first reference feature and the second reference feature may have the same dimension. At this time, the number of dimensions is equal to the number of images in the reference video. For example, it may be specified that the reference video includes 16 (or other numbers) images.

Figure 5:
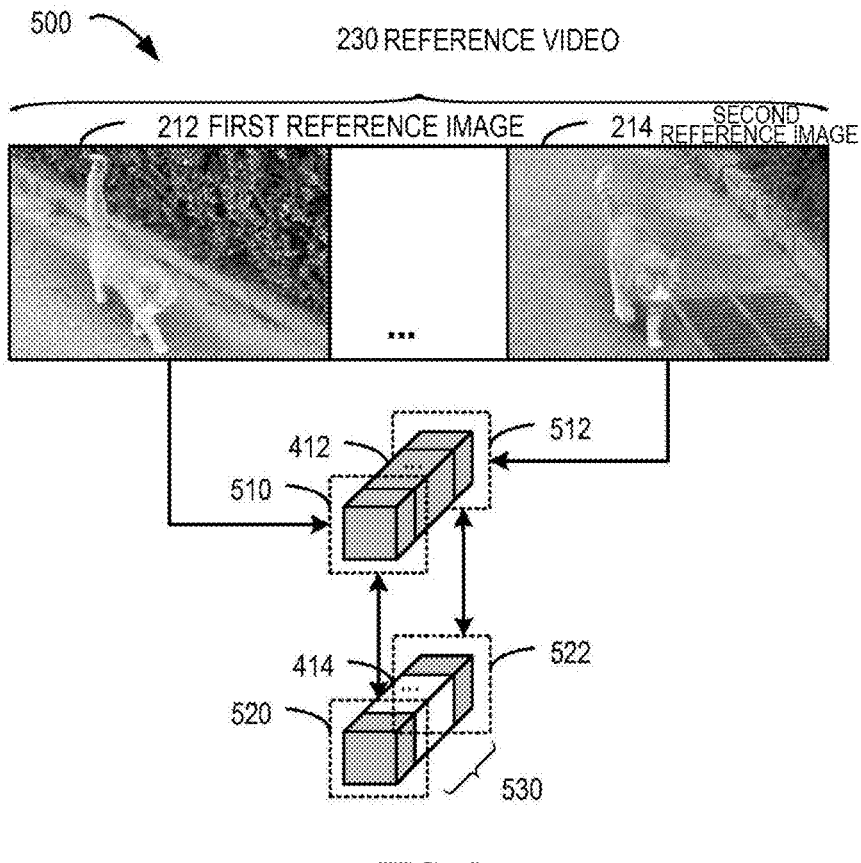
FIG. 5 shows a block diagram of a process of determining a reference feature of a reference video according to some implementations of the present disclosure.

More details about feature determination are described with reference to FIG. 5, which shows a block diagram 500 of a process of determining the reference feature of the reference video according to some implementations of the present disclosure. As shown in FIG. 5, respective reference images in the reference video 230 may be processed one by one. For example, the feature of the first reference image 212 may be extracted by using the encoder model to generate the first reference image feature. The first reference image feature may be placed at a first position (i.e., position 510) of the first reference feature 412. Then, the reference image feature of another reference image after the first reference image 212 may be extracted by using the encoder model, and this reference image feature is placed at a second position of the first reference feature 412, and so on. Respective reference images in the reference video 230 may be continuously processed until the second reference image feature of the last reference image (i.e., the second reference image 214) in the reference video 230 is placed at the last position (i.e., position 512) of the first reference feature 412.

Similarly, the encoder model 310 may be used to determine the second reference feature of the reference video. The encoder model 410 may be used to extract the feature of the first reference image 212 in order to generate the first reference image feature. The first reference image feature may be placed at the first position (i.e., the position 520) of the second reference feature 442. The encoder model 410 may be used to place the second reference image feature of the last reference image (i.e., the second reference image 214) in the reference video 230 at the last position 522 of the second reference feature 414.

As shown in FIG. 5, the position (i.e., the first position) of the first reference image feature in the second reference feature 414 corresponds to the position (i.e., the first position) of the first reference image in the reference video, and the position (i.e., the last position) of the second reference image feature in the second reference feature 414 corresponds to the position (i.e., the last position) of the second reference image in the reference video. In this way, it is convenient to align the first reference feature and the second reference feature in a subsequent connection process, thereby facilitating the improvement of the accuracy of the diffusion model.

According to an example implementation of the present disclosure, the features at positions other than the first position and the second position in the second reference feature may be set to be empty. Specifically, position 530 in FIG. 5 may be set to be empty, for example, data "0" may be filled. In this way, the second reference feature can strengthen an influence of the first reference image and second reference image on the video generation process, so that the generation model can learn more knowledge about a transformation relationship between the first reference image and the second reference image.

Specifically, the reference video may be encoded with the VA E and the first reference feature 412 is acquired, that is, each frame in the reference video is encoded with the VAE respectively. The VA E may be used to encode the first reference image and the second reference image, and then positions of intermediate frames are completed with 0, so as to form the second reference feature 414 (the dimension is the same as that of the first reference feature 412).

Returning to FIG. 4, the diffusion model 430 may be determined based on the first reference feature 412, the second reference feature 414, and the reference text 210. Specifically, based on principles of the diffusion model, noise may be added to the first reference feature 412 and the second reference feature 414 respectively (for example, different levels of noise may be added to the two features in different ways), so as to generate a first noise reference feature 412' and a second noise reference feature 414'. Further, the connection model 420 may be used to connect the first noise reference feature 412' and the second noise reference feature 414' and generate a feature 422. Further, corresponding training data may be constructed based on the principles of the diffusion model, and then parameters of the diffusion model 430 are updated.

According to an example implementation of the present disclosure, the diffusion model 430 may be implemented based on various structures currently known and/or to be developed in the future. A diffusion process of the diffusion model 430 involves a forward noising process and a backward denoising process. In the forward noising process, noise data may be added to the feature in multiple steps respectively. For example, the initial feature may be expressed as Z_0. In each step, the noise data may be added continuously. The noise feature of step t may be expressed as Z_t, and the noise feature of step t+1 may be expressed as Z_(t+1). For example, the noise data may be added to Z_t at step t. Then, at step T, random Gaussian data may be acquired.

In the backward denoising process, an inverse process of the above noising process may be executed in multiple steps, so as to gradually acquire the initial feature. Specifically, the random Gaussian data, the reference text and the corresponding second reference feature may be input into the diffusion model, so that the denoising process is executed step by step in multiple steps. For example, part of the noise in the noise feature Z_t may be removed in the $t^{th}$ step, so as to form a cleaner noise feature Z_(t−1) relative to the noise feature Z_t. Each denoising process may be executed in an iterative way, so that the initial feature (i.e., the video feature without the added noise) is derived backwardly.

According to an example implementation of the present disclosure, in the process of determining the diffusion model, the processing model 420 may be used to connect the first reference feature and the second reference feature to generate the reference feature of the reference video, noising processing may be executed on the reference feature to generate the noise reference feature 422 of the reference video, and then the diffusion model 430 is used to determine a reconstruction feature 432 (for example, denoted as $\hat{Z}$) of the reference video based on the noise reference feature 422 and the reference text 210. Further, a loss function is constructed based on a difference between the reconstruction feature and the reference feature, and then the diffusion model 430 is updated by using the loss function.

According to an example implementation of the present disclosure, a 2D UNet (U-type network) may be adopted to implement the diffusion model. The model may be constructed by spatial down-sampling followed by spatial up-sampling through inserting jump connections. Specifically, the model may include two basic blocks, i.e., a 2D convolution block and 2D attention. The 2D U Net is extended to 3D by inserting a temporal layer, wherein a 1D convolution layer is behind a 2D convolution layer along a temporal dimension, and a 1D attention layer is behind a 2D attention layer along the temporal dimension. The model may be trained together with the images and videos to maintain a high-fidelity spatial generation ability and disable 1D time operation of image input. Bidirectional self-attention may be used in all attention levels. The pre-trained text encoder is used to encode the text instructions, and the embedded $c^{text}$ is injected through a cross-attention layer in the U Net, with the hidden state as a query and the $c^{text}$ as a key and value.

With regard to injection of the image instructions, the image instructions of the first frame and the last frame may be combined with text guidance. Given the image instructions on the first frame and the last frame, for example, expressed as {first, Past}, the above representation may be encoded into the same hidden space as an input space of the diffusion model to generate $\{f^{first}, f^{last}\}$, wherein $f \in \mathbb{R}^{C*H*W}$. In order to insert the instructions without losing time and position information, the final image condition then may be constructed as $c^{image} = [f^{first}, \text{PADs}, f^{last}] \in \mathbb{R}^{F*C*H*W}$, wherein $\text{PADS} \in \mathbb{R}^{(F-2)*C*H*W}$. The condition $c^{text}$ is then connected with the noised hidden feature $z_t$ along a channel dimension, which is used as the input of the diffusion model.

According to an example implementation of the present disclosure, the first reference image, the second reference image and the reference text may be determined from a large number of reference videos, and then the first reference feature Z, the second reference feature $c^{image}$ and the corresponding reconstruction feature $\hat{Z}$ of each reference video are determined in the way described above. Here, the reconstruction feature is determined by the diffusion model 430 and includes an influence of the forward noising process. At this time, the loss function may be constructed based on the difference between the first reference feature Z and the corresponding reconstruction feature $\hat{Z}$.

The diffusion model 430 may be continuously updated in an iterative way with a large number of reference videos until expected stopping conditions are met. It should be understood that there is no need to manually label data in this process, but the first frame and the last frame of the reference video and the corresponding text description may be directly used as training data. In this way, the workload of acquiring manually labeled data can be eliminated, thereby improving the efficiency of acquiring the generation model 220.

It should be understood that although the above shows an example in which the second reference feature $c^{image}$ includes relevant feature information of both the first reference image and the second reference image, alternatively and/or additionally, in some cases, the second reference feature $c^{image}$ may only include the feature information of the first reference image. Specifically, the second reference image feature in the second reference features may be set to be empty according to a predetermined condition. In other words, the feature at the position 522 may be removed in FIG. 5, for example, the value at this position may be set to 0.

With the example implementation of the present disclosure, the second reference image feature may be removed according to a predetermined ratio (for example, 25% or other numerical values). In this way, the application scene not considering the second reference image can be involved in the process of updating the generation model, so that the generation model can be adapted to more application scenes, thereby improving the accuracy of the generation model in various cases.

According to an example implementation of the present disclosure, the generation model 220 may be trained based on various ways currently known and/or to be developed in the future, so that the generation model 220 can grasp an association relationship between the first image, the second image, the text for describing the video content and the corresponding video.

According to an example implementation of the present disclosure, the generation model 230 further includes the decoder model 440. After the generation model 220 has been acquired, a demand on video generation may be input to generation model 220, thereby generating a corresponding target video. According to an example implementation of the present disclosure, the first image and the text may be input to the generation model, and then the corresponding target video is generated by using the generation model. According to an example implementation of the present disclosure, the first image, the second image and the text may be input to the generation model, and then the corresponding target video is generated by using the generation model. Alternatively and/or additionally, the text may even be empty, and the target video may still be generated.

In order to acquire a more anticipated target video, the first image and the second image for generating the target video and the text for describing the content of the target video may be received. Then, according to the well trained diffusion model, the reconstruction feature of the target video may be generated based on the first image, the second image and the text. Further, the target video may be generated based on the reconstruction feature according to the decoder model. In this way, the diffusion model 430 can be fully used to execute the backward denoising process, thereby acquiring the reconstruction feature of the target video in a more accurate way.

Figure 6:
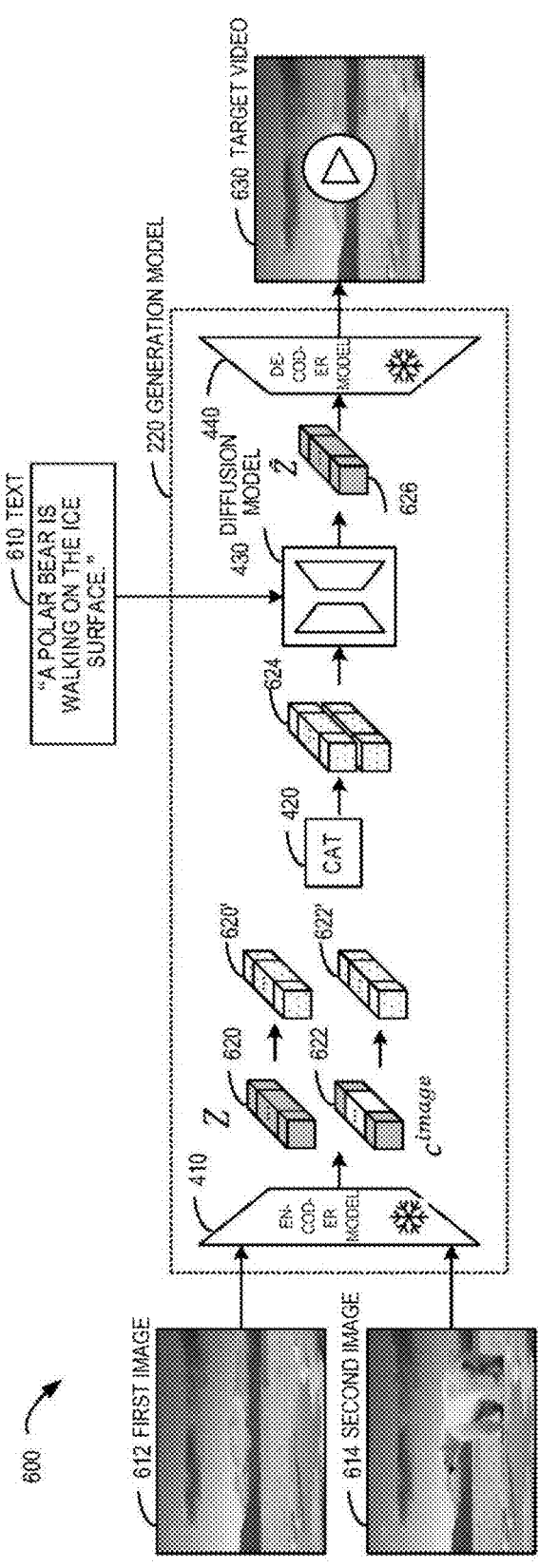
FIG. 6 shows a block diagram of a process for generating a target video according to some implementations of the present disclosure.

More details about video generation are described with reference to FIG. 6, which shows a block diagram 600 of a process for generating a target video according to some implementations of the present disclosure. As shown in FIG. 6, a first image 612, a second image 614, and a text 610 for describing an image content may be received. Here, the first image 612 may include, for example, an ice surface, so as to be used as the first frame of a target video 630 to be generated. The second image 614 may include, for example, an ice surface and a polar bear on the ice surface. The second image 614 may be used as guidance information to generate the last frame of the target video 630. A t this time, the generation model 220 will generate the target video 630 under the condition of the text 610, and the content of the video is "a polar bear is walking on the ice surface".

The first image 612, the second image 614, and the text 610 may be input to the generation model 220. At this time, the generation model 220 will output the target video 630, the first frame of the target video 630 corresponds to the first image 612 and the last frame of the target video 630 corresponds to the second image 614. It should be understood that since the target video 630 has not been generated at this time, the noise feature is used as a first feature 620 of the target video 630. According to an example implementation of the present disclosure, the first feature 620 may be determined by using a Gaussian noise.

Further, a second feature 622 of the target video 630 may be generated based on the first image 612 and the second image 614 according to the encoder model 410. For example, the encoder model 410 may be used to determine a first image feature of the first image 612 and a second image feature of the second image 614 respectively. Then, the first image feature may be placed at the first position of the second feature 622 and the second image feature may be placed at the tail position of the second feature 622. It should be understood that the process of generating the second feature 622 here is similar to that in the training stage, and is thus not repeated here.

When the first feature 620 and the second feature 622 have been determined, a reconstruction feature 626 of the target video may be acquired by using the first feature 620, the second feature 622 and the text 610 according to the diffusion model. By a process similar to the process of determining the reconstruction feature in the training stage, a first noise feature 620' and a second noise feature 622' may be acquired, and the first noise feature 620' and the second noise feature 622' are connected by using the connection model 420 to form a noise feature 624. Further, the backward denoising stage of the diffusion model 430 may be used to generate the reconstruction feature 626.

It should be understood that since the diffusion model 430 has been trained based on the above loss function, the reconstruction feature 626 generated by the diffusion model 430 at this time can accurately describe information of all aspects of the target video 630. Further, the reconstruction feature 626 may be input to the decoder model 440, at this time, the decoder model 440 will output the corresponding target video 630, and the target video 630 will be accurately matched with the first image 612, the second image 614 and the text 610 in the input data.

Figure 7:
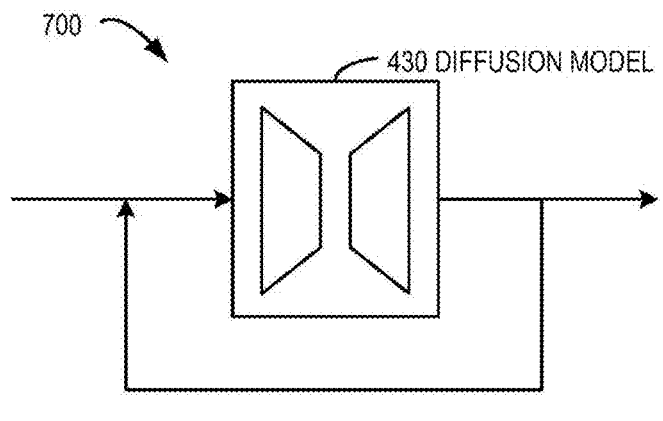
FIG. 7 shows a block diagram of an operation process of a diffusion model in a process of generating a target video according to some implementations of the present disclosure.

It should be understood that in the process of video generation, the backward denoising process of the diffusion model 430 may be executed in an iterative way, and more details are described with reference to FIG. 7, which shows a block diagram 700 of an operation process of a diffusion model in a process of generating a target video according to some implementations of the present disclosure. As shown in FIG. 7, the backward denoising process may be iteratively executed in a plurality of steps. It is assumed that the total number of the plurality of steps is T, then in a first step (t=1), the reconstruction feature 626 of the target video may be acquired by using the first feature 620, the second feature 622 and the text 610.

Then, in a second step (t=2) after the first step of the plurality of steps, the first feature may be set as the reconstruction feature of the target video, and $\hat{Z}$ is used to replace Z, thereby performing subsequent processing. In the second step, the diffusion model may use the first feature, the second feature and the text to acquire a new reconstruction feature. In a subsequent third step (t=3), similar processing may be executed until the predetermined $T^{th}$ step is reached. At this point, the backward denoising process is ended, and the output reconstruction feature is a feature describing the target video 630 to be generated. With the example implementation of the present disclosure, the noise may be gradually removed in the plurality of backward denoising steps, and the more accurate reconstruction feature is generated.

According to an example implementation of the present disclosure, a guidance function of the second image 614 may be further weakened. Specifically, the part of the second feature 622 associated with the second image 614 may be considered only in part of the plurality of steps. For example, in a group of steps in the plurality of steps, the part may be removed from the second feature, that is, the part of the second feature corresponding to the second image is set to be empty. In FIG. 6, the feature located at the last position in the second feature 622 may be set to 0.

Specifically, in the first τ steps of all T denoising steps, the last frame condition may be applied to guide the video generation towards a desired end state, and the last frame condition is discarded in the subsequent steps to generate a more credible and temporally consistent video:

$$\tilde{x}_\theta = \begin{cases} \tilde{x}_\theta(z_t, f^{first}, f^{last}, c^{text}), \text{ if } t < \tau \\ \tilde{x}_\theta(z_t, f^{first}, c^{text}), \text{ if } 0 \le \tau \le T \end{cases} \quad \text{Formula 1}$$

In the above formula, $\tau$ determines a dependence degree of the model on the last frame instruction, and various applications can be realized by adjusting $\tau$. For example, this model can generate a high-quality video without the last frame condition (i.e., $\tau=0$). In addition, classifier-free guidance may be applied, which mixes the model score estimation under the conditions of text prompt and text-free prompt.

According to an example implementation of the present disclosure, the number of steps not considering the second image 614 may be determined according to a predetermined ratio. For example, in the step of $\tau=T*40\%$ (or other numerical values) in all T steps, the influence of the second image 614 may not be considered. It is assumed that T=50, then the complete second feature 622 is used in the first 30(50*(1-40%)) steps; and further in the next 20(50*40%) steps, the value at the last position in the second feature 622 may be set to 0. In this way, functions of the first image 612 and the text 610 in generating the target video can be enhanced, so that the generated target video 630 is more in line with expectations.

Figure 8:
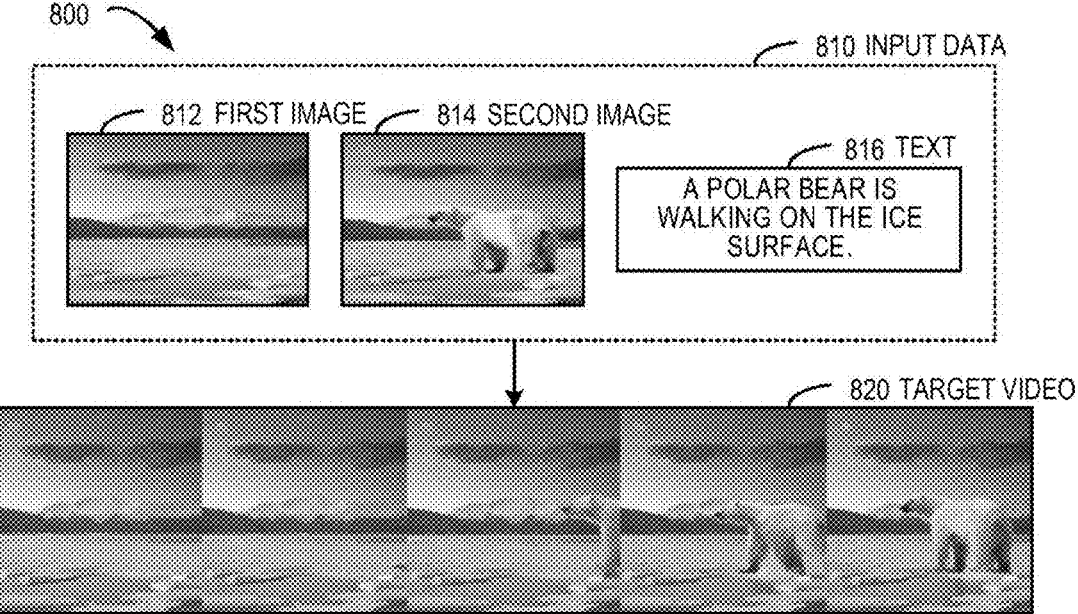
FIG. 8 shows a block diagram of generating a target video based on input data according to some implementations of the present disclosure.

According to an example implementation of the present disclosure, the second image is an image that specifies an end image of the target video. More details are described with reference to FIG. 8, which shows a block diagram 800 of generating a target video based on input data according to some implementations of the present disclosure. As shown in FIG. 8, input data 810 may include a first image 812, a second image 814 and a text 816. At this time, the second image 814 may guide the generation of the last frame in a target video 820. For example, the last frame may be the same as the second image 814. At this time, the first frame of the target video 820 corresponds to the first image 812, the last frame of the target video 820 corresponds to the second image 814, and the content of the video is "a polar bear is walking on the ice surface".

Figure 9:
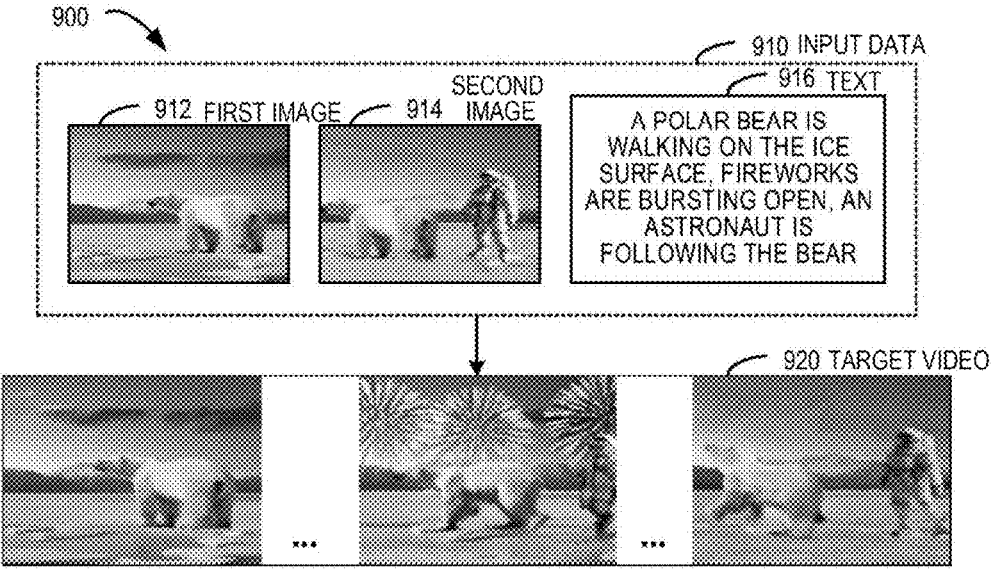
FIG. 9 shows a block diagram of generating a target video based on input data according to some implementations of the present disclosure.

FIG. 9 shows a block diagram 900 of generating a target video based on input data according to some implementations of the present disclosure. As shown in FIG. 9, input data 910 may include a first image 912, a second image 914 and a text 916. At this time, the second image 914 may guide the generation of the last frame in a target video 920. For example, the last frame may be the same as the second image 914. At this time, the first frame of the target video 920 corresponds to the first image 912, the last frame of the target video 920 corresponds to the second image 914, and the content of the video is "a polar bear is walking on the ice surface, fireworks are bursting open, and an astronaut is following the bear". With the example implementation of the present disclosure, the second image can accurately describe an end picture of the target video, so that the video generation may be controlled in a more accurate way.

Figure 10:
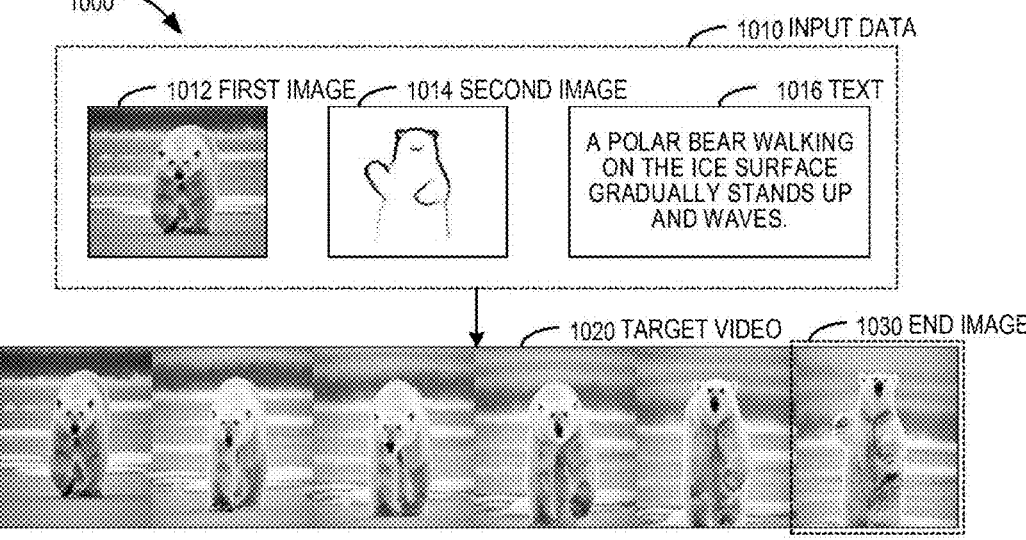
FIG. 10 shows a block diagram of generating a target video based on input data according to some implementations of the present disclosure.

According to an example implementation of the present disclosure, the second image may be a sketch specifying the content of the end image of the target video. It should be understood that in some cases, it is difficult to acquire the end picture of the target video to be generated, and at this time, the content of the end image may be specified based on the sketch (for example, hand drawing). FIG. 10 shows a block diagram 1000 of generating a target video based on input data according to some implementations of the present disclosure. As shown in FIG. 10, input data 1010 may include a first image 1012, a second image 1014 and a text 1016. At this time, the second image 1014 may guide the generation of the last frame in a target video 1020.

At this time, the polar bear in the last frame may wave according to a gesture specified in the second image 1014. At this time, the first frame of the target video 1020 corresponds to the first image 1012, the last frame of the target video 1020 corresponds to the second image 1014, and the content of the video is "a polar bear walking on the ice surface gradually stands up and waves". With the example implementation of the present disclosure, the gesture and position of an object in the video can be specified in a more convenient and effective way, thereby facilitating the generation of the video including richer visual contents.

According to an example implementation of the present disclosure, a plurality of videos may be generated in a continuous way. Specifically, in the case where the target video has been generated in the way described above, the end image of the target video may be set as a first image of a further target video. Further, a second image for generating the further target video and an additional text describing a content of the further target video may be received, and the further target video is generated based on the first image and the second image of the further target video and the additional text according to the generation model.

Specifically, in the case where the target video 1020 has been acquired, an end image 1030 in the target video 1020 may be used as the first image for generating the next video. Further, a second image (for example, an image of the polar bear sleeping on the ice surface) may be input, and a text "a polar bear gradually lies down and falls asleep" is input. At this time, the new video generated subsequently will start with the end image 1030 in the target video 1020, and the last frame of the new video corresponds to the image of the sleeping polar bear.

According to an example implementation of the present disclosure, the target video and the further target video may be connected. With the example implementation of the present disclosure, the end image of the current video may be used as the start image of the next video to be generated in a step-by-step accumulation way. In this way, a long video including richer plots can be generated step by step. With the example implementation of the present disclosure, the complexity of video creation can be greatly simplified. For example, shorter videos may be constructed in the way of film storyboards, and then these videos may be edited to generate longer videos.

In summary, according to an example implementation of the present disclosure, a new video generation architecture Pixel Dance based on the diffusion model is proposed, and this architecture combines the image instructions of the first frame and the last frame and text guidance. The corresponding training process and reasoning process can be realized based on the Pixel Dance architecture. With the example implementation of the present disclosure, flexible control over the video generation process and last frame guidance of different intensities can be provided.

The proposed technical solution may be executed on a variety of data sets, and experiments show that the video generated by the Pixel Dance has strong advantages in the aspects of synthesizing complex scenes and/or actions. Specifically, the generation model can be trained by using various available data sets, each video in the data sets is associated with a paired text, and the text usually provides a rough description and shows a weak correlation with the video contents. Since the image instructions are helpful to learn complex video distribution, the Pixel Dance can make full use of various data sets without labeling data, which shows excellent ability in generation of the videos with complex scenes and movements.

Example Process

Figure 11:
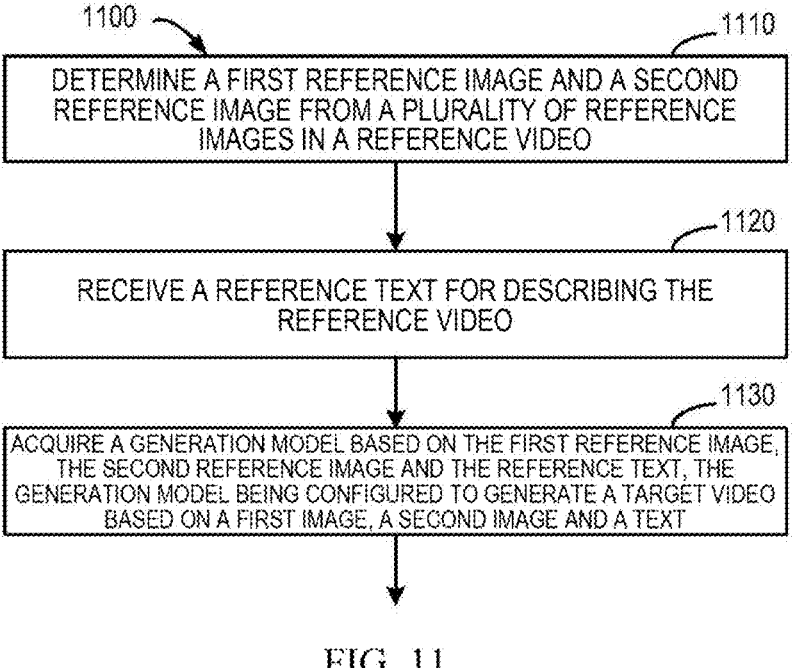
FIG. 11 shows a flowchart of a method for generating a video according to some implementations of the present disclosure.

FIG. 11 shows a flowchart of a method 1100 for generating a video according to some implementations of the present disclosure. At block 1110, a first reference image and a second reference image are determined from a plurality of reference images in a reference video. At block 1120, a reference text describing the reference video is received. At block 1130, a generation model is acquired based on the first reference image, the second reference image and the reference text, and the generation model is used to generate a target video based on a first image, a second image and a text.

According to an example implementation of the present disclosure, determining the first reference image includes: determining a reference image located at the head of the reference video as the first reference image.

According to an example implementation of the present disclosure, determining the second reference image includes: determining the second reference image from a group of reference images located within a predetermined range at the tail of the reference video.

According to an example implementation of the present disclosure, the generation model includes an encoder model and a diffusion model, and acquiring the generation model based on the first reference image, the second reference image and the reference text includes: determining a first reference feature of the reference video by using the encoder model, wherein the first reference feature includes a plurality of reference image features of the plurality of reference images; determining a second reference feature of the reference video by using the encoder model, wherein the second reference feature includes a first reference image feature of the first reference image and a second reference image feature of the second reference image; and determining the diffusion model based on the first reference feature, the second reference feature, and the reference text.

According to an example implementation of the present disclosure, a first position of the first reference image feature in the second reference feature corresponds to a position of the first reference image in the reference video, and a second position of the second reference image feature in the second reference feature corresponds to a position of the second reference image in the reference video.

According to an example implementation of the present disclosure, a dimension of the second reference feature is equal to a dimension of the first reference feature, and features at positions other than the first position and the second position in the second reference feature are set to be empty.

According to an example implementation of the present disclosure, the method further includes: setting the second reference image feature to be empty according to a predetermined condition.

According to an example implementation of the present disclosure, determining the diffusion model based on the first reference feature, the second reference feature, and the reference text includes: executing noise processing for the first reference feature and the second reference feature respectively to generate a first noise reference feature and a second noise reference feature of the reference video; connecting the first noise reference feature and the second noise reference feature to generate a noise reference feature of the reference video; determining a reconstruction feature of the reference video based on the noise reference feature and the reference text by using the diffusion model; and updating the diffusion model based on a difference between the reconstruction feature and the reference feature.

According to an example implementation of the present disclosure, the generation model further includes a decoder model, and the method further includes: receiving the first image for generating the target video and the text for describing a content of the target video; generating a reconstruction feature of the target video based on the first image and the text according to the diffusion model; and generating the target video based on the reconstruction feature according to the decoder model.

According to an example implementation of the present disclosure, generating the reconstruction feature of the target video further includes: receiving the second image for generating the target video; and generating the reconstruction feature of the target video based on the second image.

According to an example implementation of the present disclosure, generating the reconstruction feature of the target video includes: using a noise feature as a first feature of the target video; generating a second feature of the target video based on the first image and the second image according to the encoder model; and acquiring the reconstruction feature of the target video by using the first feature, the second feature and the text according to the diffusion model.

According to an example implementation of the present disclosure, acquiring the reconstruction feature of the target video includes: in a first step of a plurality of steps, acquiring the reconstruction feature of the target video by using the first feature, the second feature and the text; and in a second step after the first step of the plurality of steps, setting the first feature as the reconstruction feature of the target video; and acquiring the reconstruction feature of the target video based on the first feature, the second feature and the text according to the diffusion model.

According to an example implementation of the present disclosure, the method further includes: in a group of steps in the plurality of steps, setting a part of the second feature corresponding to the second image to be empty.

According to an example implementation of the present disclosure, the second image includes at least any one of the following: an image for specifying an end image of the target video and a sketch for specifying a content of the end image of the target video.

According to an example implementation of the present disclosure, the method further includes: setting the end image of the target video as a first image of a further target video; receiving a second image for generating the further target video and an additional text describing a content of the further target video; and generating the further target video based on the first image and the second image of the further target video and the additional text according to the generation model.

According to an example implementation of the present disclosure, the method further includes: connecting the target video and the further target video.

Example Apparatus and Device

Figure 12:
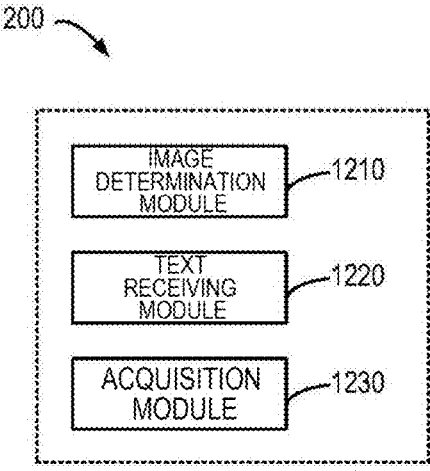
FIG. 12 shows a block diagram of an apparatus for generating a video according to some implementations of the present disclosure.

FIG. 12 shows a block diagram of an apparatus 1200 for generating a video according to some implementations of the present disclosure. The apparatus includes an image determination module 1210 configured to determine a first reference image and a second reference image from a plurality of reference images in a reference video; a text receiving module 1220 configured to receive a reference text determined for describing the reference video; and an acquisition module 1230 configured to acquire a generation model based on the first reference image, the second reference image and the reference text, and the generation model is used to generate a target video based on a first image, a second image and a text.

According to an example implementation of the present disclosure, the image determination module includes: a first image determination module configured to determine a reference image located at the head of the reference video as the first reference image.

According to an example implementation of the present disclosure, the image determination module includes: a second image determination module configured to determine the second reference image from a group of reference images located within a predetermined range at the tail of the reference video.

According to an example implementation of the present disclosure, the generation model includes an encoder model and a diffusion model, and the acquisition module includes: a first encoding module configured to determine a first reference feature of the reference video by using the encoder model, wherein the first reference feature includes a plurality of reference image features of the plurality of reference images; a second encoding module configured to determine a second reference feature of the reference video by using the encoder model, wherein the second reference feature includes a first reference image feature of the first reference image and a second reference image feature of the second reference image; and a determination module configured to determine the diffusion model based on the first reference feature, the second reference feature, and the reference text.

According to an example implementation of the present disclosure, a first position of the first reference image feature in the second reference feature corresponds to a position of the first reference image in the reference video, and a second position of the second reference image feature in the second reference feature corresponds to a position of the second reference image in the reference video.

According to an example implementation of the present disclosure, a dimension of the second reference feature is equal to a dimension of the first reference feature, and features at positions other than the first position and the second position in the second reference feature are set to be empty.

According to an example implementation of the present disclosure, the apparatus further includes: a setting module configured to set the second reference image feature to be empty according to a predetermined condition.

According to an example implementation of the present disclosure, the determination module includes: a noise module configured to execute noise processing for the first reference feature and the second reference feature respectively to generate a first noise reference feature and a second noise reference feature of the reference video; a connection module configured to connect the first noise reference feature and the second noise reference feature to generate a noise reference feature of the reference video; a reconstruction module configured to determine a reconstruction feature of the reference video based on the noise reference feature and the reference text by using the diffusion model; and an updating module configured to update the diffusion model based on a difference between the reconstruction feature and the reference feature.

According to an example implementation of the present disclosure, the generation model further includes a decoder model, and the apparatus further includes: a receiving module configured to receive the first image for generating the target video and the text for describing a content of the target video; a generation module configured to generate a reconstruction feature of the target video based on the first image and the text according to the diffusion model; and a video generation module configured to generate the target video based on the reconstruction feature according to the decoder model.

According to an example implementation of the present disclosure, the receiving module is further configured to: receive the second image for generating the target video; and the reconstruction module is further configured to: generate the reconstruction feature of the target video based on the second image.

According to an example implementation of the present disclosure, the reconstruction module includes: a setting module configured to use a noise feature as a first feature of the target video; an encoding module configured to generate a second feature of the target video based on the first image and the second image according to the encoder model; and a feature acquisition module configured to acquire the reconstruction feature of the target video by using the first feature, the second feature and the text according to the diffusion model.

According to an example implementation of the present disclosure, the feature acquisition module includes: a first reconstruction module configured to, in a first step of a plurality of steps, acquire the reconstruction feature of the target video by using the first feature, the second feature and the text; a setting module configured to, in a second step after the first step of the plurality of steps, set the first feature as the reconstruction feature of the target video; and a second reconstruction module configured to acquire the reconstruction feature of the target video based on the first feature, the second feature and the text according to the diffusion model.

According to an example implementation of the present disclosure, the apparatus further includes: a removing module configured to, in a group of steps in the plurality of steps, set a part of the second feature corresponding to the second image to be empty.

According to an example implementation of the present disclosure, the second image includes at least any one of the following: an image for specifying an end image of the target video and a sketch for specifying a content of the end image of the target video.

According to an example implementation of the present disclosure, the apparatus further includes: an image setting module configured to set the end image of the target video as a first image of a further target video; the receiving module is further configured to receive a second image for generating the further target video and an additional text describing a content of the further target video; and the generation module is further configured to generate the further target video based on the first image and the second image of the further target video and the additional text according to the generation model.

According to an example implementation of the present disclosure, the apparatus further includes: a connection module configured to connect the target video and the further target video.

Figure 13:
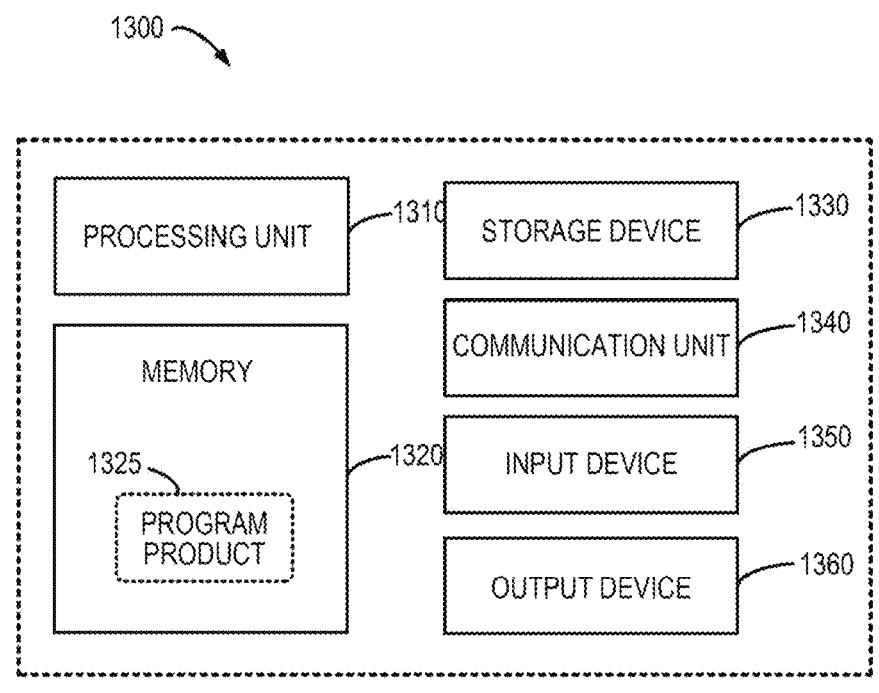
FIG. 13 shows a block diagram of a device capable of implementing multiple implementations of the present disclosure.

FIG. 13 shows a block diagram of a device 1300 capable of implementing multiple implementations of the present disclosure. It should be understood that the computing device 1300 shown in FIG. 13 is merely example and should not constitute any limitation on the functions and scope of the implementations described herein. The computing device 1300 shown in FIG. 13 may be used to implement the method described above.

As shown in FIG. 13, the computing device 1300 is in the form of a general-purpose computing device. Components of the computing device 1300 may include, but are not limited to, one or more processors or processing units 1310, a memory 1320, a storage device 1330, one or more communication units 1340, one or more input devices 1350, and one or more output devices 1360. The processing unit 1310 may be an actual or virtual processor and can execute various processing according to programs stored in the memory 1320. In a multiprocessor system, multiple processing units execute computer-executable instructions in parallel to improve a parallel processing capability of the computing device 1300.

The computing device 1300 typically includes multiple computer storage mediums. Such mediums may be any available mediums accessible by the computing device 1300, and include but are not limited to volatile and nonvolatile mediums, and removable and non-removable mediums. The memory 1320 may be a volatile memory (such as a register, a cache and a random access memory (RAM)), a nonvolatile memory (such as a read-only memory (ROM), an electrically erasable programmable read-only memory (EEPROM) and a flash memory) or some combinations thereof. The storage device 1330 may be a removable or non-removable medium and may include a machine-readable medium, such as a flash drive, a magnetic disk or any other mediums, which can be used to store information and/or data (such as training data for training) and may be accessed within the computing device 1300.

The computing device 1300 may further include additional removable/non-removable, volatile/nonvolatile storage mediums. Although not shown in FIG. 13, a disk drive for reading from or writing into a removable and nonvolatile magnetic disk (such as a "floppy disk") and an optical disk drive for reading from or writing into a removable and nonvolatile optical disk may be provided. In these cases, each drive may be connected to a bus (not shown) by one or more data medium interfaces. The memory 1320 may include a computer program product 1325 having one or more program modules configured to execute various methods or actions according to various implementations of the present disclosure.

The communication unit 1340 realizes communication with other computing devices through a communication medium. Additionally, functions of the components of the computing device 1300 may be realized in a single computing cluster or a plurality of computing machines, and these computing machines can communicate through communication connections. Therefore, the computing device 1300 can operate in a networked environment by using logical connections with one or more other servers, a network personal computer (PC) or another network node.

The input device 1350 may be one or more input devices, such as a mouse, a keyboard and a trackball. The output device 1360 may be one or more output devices, such as a display, a speaker and a printer. The computing device 1300 may also communicate with one or more external devices (not shown), such as storage devices and display devices, through the communication unit 1340 as needed, communicate with one or more devices that enable users to interact with the computing device 1300, or communicate with any devices (such as network cards and modems) that enable the computing device 1300 to communicate with one or more other computing devices. Such communication may be executed via an input/output (I/O) interface (not shown).

According to an example implementation of the present disclosure, a computer-readable storage medium is provided and has computer-executable instructions stored thereon, wherein the computer-executable instructions are executed by a processor to implement the method described above. According to an example implementation of the present disclosure, a computer program product is also provided, is tangibly stored on a non-transitory computer-readable medium, and includes computer-executable instructions, which are executed by a processor to implement the method described above. According to an example implementation of the present disclosure, a computer program product is provided and has a computer program stored thereon, which, when executed by a processor, implements the method described above.

Various aspects of the present disclosure are described herein with reference to the flowcharts and/or block diagrams of the method, apparatus, device and computer program product implemented according to the present disclosure. It should be understood that each block of the flowcharts and/or block diagrams and combinations of various blocks in the flowcharts and/or block diagrams may be realized by computer-readable program instructions.

These computer-readable program instructions may be provided to the processing unit of a general-purpose computer, a special-purpose computer or other programmable data processing apparatus to produce a machine, so that these instructions, when executed by the processing unit of the computer or other programmable data processing apparatus, produce the apparatus realizing the functions/actions specified in one or more blocks in the flowcharts and/or block diagrams. These computer-readable program instructions may also be stored in a computer-readable storage medium, and these instructions enable the computer, the programmable data processing apparatus and/or other devices to work in a particular way, so that the computer-readable medium having the instructions stored includes an article of manufacture including the instructions realizing various aspects of the functions/actions specified in one or more blocks in the flowcharts and/or block diagrams.

The computer-readable program instructions may be loaded onto the computer, other programmable data processing apparatuses, or other devices, such that a series of operation steps are executed on the computer, other programmable data processing apparatuses, or other devices to produce a computer-implemented process. Therefore, the instructions executed on the computer, other programmable data processing apparatuses, or other devices realize the functions/actions specified in one or more blocks in the flowcharts and/or block diagrams.

The flowcharts and block diagrams in the figures show possibly realized architectures, functions and operations of systems, methods and computer program products according to multiple implementations of the present disclosure. In this regard, each block in the flowcharts or block diagrams may represent a module, a program segment or a part of instruction, and the module, the program segment or the part of instruction contains one or more executable instructions for realizing specified logical functions. In some alternative implementations, the functions noted in the blocks may also occur in a different order than those noted in the figures. For example, two consecutive blocks may be actually executed substantially in parallel, and sometimes they may be executed in a reverse order, depending on the functions involved. It should also be noted that each block in the block diagrams and/or flowcharts and combinations of the blocks in the block diagrams and/or flowcharts may be realized by a dedicated hardware-based system executing specified functions or actions, or may be realized by a combination of dedicated hardware and computer instructions.

Various implementations of the present disclosure have been described above, and the above descriptions are exemplary, are not exhaustive, and are not limited to the disclosed various implementations. M any modifications and changes will be obvious to those ordinary skilled in the art without departing from the scope and spirit of the described various implementations. The terminology used herein is chosen to best explain principles of various implementations, practical application or improvement to technologies in the market, or to enable other ordinary skilled in the art to understand various implementations disclosed herein.

What is claimed is:

1. A method for generating a video, comprising:
determining a first reference image and a second reference image from a plurality of reference images in a reference video, the first reference image being located at a head of the reference video, and the second reference image being located within a predetermined range at a tail of the reference video;
receiving a reference text for describing the reference video; and
acquiring a generation model based on the first reference image, the second reference image and the reference text, the generation model being configured to generate a target video based on a first image, a second image and a text.

2. The method according to claim 1, wherein the generation model comprises an encoder model and a diffusion model, and acquiring the generation model based on the first reference image, the second reference image and the reference text comprises:
determining a first reference feature of the reference video by using the encoder model, the first reference feature comprising a plurality of reference image features of the plurality of reference images;
determining a second reference feature of the reference video by using the encoder model, the second reference feature comprising a first reference image feature of the first reference image and a second reference image feature of the second reference image; and
determining the diffusion model based on the first reference feature, the second reference feature, and the reference text.

3. The method according to claim 2, wherein a first position of the first reference image feature in the second reference feature corresponds to a position of the first reference image in the reference video, and a second position of the second reference image feature in the second reference feature corresponds to a position of the second reference image in the reference video.

4. The method according to claim 3, wherein a dimension of the second reference feature is equal to a dimension of the first reference feature, and features at positions other than the first position and the second position in the second reference feature are set to be empty.

5. The method according to claim 3, further comprising: setting the second reference image feature to be empty according to a predetermined condition.

6. The method according to claim 2, wherein determining the diffusion model based on the first reference feature, the second reference feature, and the reference text comprises:

performing noise processing for the first reference feature and the second reference feature respectively to generate a first noise reference feature and a second noise reference feature of the reference video;
connecting the first noise reference feature and the second noise reference feature to generate a noise reference feature of the reference video;
determining a reconstruction feature of the reference video based on the noise reference feature and the reference text by using the diffusion model; and
updating the diffusion model based on a difference between the reconstruction feature and the reference feature.

7. The method according to claim 2, wherein the generation model further comprises a decoder model, and the method further comprises:
receiving the first image for generating the target video and the text for describing a content of the target video;
generating a reconstruction feature of the target video based on the first image and the text according to the diffusion model; and
generating the target video based on the reconstruction feature according to the decoder model.

8. The method according to claim 7, wherein generating the reconstruction feature of the target video further comprises:
receiving the second image for generating the target video; and
generating the reconstruction feature of the target video based on the second image.

9. The method according to claim 8, wherein generating the reconstruction feature of the target video comprises:
using a noise feature as a first feature of the target video;
generating a second feature of the target video based on the first image and the second image according to the encoder model; and
acquiring the reconstruction feature of the target video by using the first feature, the second feature and the text according to the diffusion model.

10. The method according to claim 9, wherein acquiring the reconstruction feature of the target video comprises:
in a first step of a plurality of steps, acquiring the reconstruction feature of the target video by using the first feature, the second feature and the text; and
in a second step after the first step of the plurality of steps, setting the first feature as the reconstruction feature of the target video; and
acquiring the reconstruction feature of the target video based on the first feature, the second feature and the text according to the diffusion model.

11. The method according to claim 10, further comprising: in a group of steps of the plurality of steps, setting a part of the second feature corresponding to the second image to be empty.

12. The method according to claim 8, further comprising:
setting the end image of the target video as a first image of a further target video;
receiving a second image for generating the further target video and a further text describing a content of the further target video; and
generating the further target video based on the first image and the second image of the further target video and the further text according to the generation model.

13. The method according to claim 12, further comprising: connecting the target video and the further target video.

14. The method according to claim 7, wherein the second image comprises at least any of the following: an image for specifying an end image of the target video and a sketch for specifying a content of the end image of the target video.

15. An electronic device comprising:

at least one processing unit; and at least one memory coupled to the at least one processing unit and storing instructions for execution by the at least one processing unit, wherein the instructions, when executed by the at least one processing unit, cause the electronic device to implement acts comprising:

determining a first reference image and a second reference image from a plurality of reference images in a reference video, the first reference image being located at a head of the reference video, and the second reference image being located within a predetermined range at a tail of the reference video;

receiving a reference text for describing the reference video; and acquiring a generation model based on the first reference image, the second reference image and the reference text, the generation model being configured to generate a target video based on a first image, a second image and a text.

16. The device according to claim 15, wherein the generation model comprises an encoder model and a diffusion model, and acquiring the generation model based on the first reference image, the second reference image and the reference text comprises:

determining a first reference feature of the reference video by using the encoder model, the first reference feature comprising a plurality of reference image features of the plurality of reference images;

determining a second reference feature of the reference video by using the encoder model, the second reference feature comprising a first reference image feature of the first reference image and a second reference image feature of the second reference image; and determining the diffusion model based on the first reference feature, the second reference feature, and the reference text.

17. The device according to claim 16, wherein a first position of the first reference image feature in the second reference feature corresponds to a position of the first reference image in the reference video, and a second position of the second reference image feature in the second reference feature corresponds to a position of the second reference image in the reference video.

18. The device according to claim 17, wherein a dimension of the second reference feature is equal to a dimension of the first reference feature, and features at positions other than the first position and the second position in the second reference feature are set to be empty.

19. The device according to claim 17, wherein the second reference image feature is set to be empty according to a predetermined condition.

20. A non-transitory computer-readable storage medium having a computer program stored thereon, wherein the computer program, when executed by a processor, causes the processor to implement acts comprising:

determining a first reference image and a second reference image from a plurality of reference images in a reference video, the first reference image being located at a head of the reference video, and the second reference image being located within a predetermined range at a tail of the reference video;

receiving a reference text for describing the reference video; and acquiring a generation model based on the first reference image, the second reference image and the reference text, the generation model being configured to generate a target video based on a first image, a second image and a text.

\* \* \* \* \*